(12) United States Patent
Rosenzweig et al.

(10) Patent No.: US 9,107,539 B2
(45) Date of Patent: Aug. 18, 2015

(54) FOOD PROCESSOR

(71) Applicant: Euro-Pro Operating LLC, Newton, MA (US)

(72) Inventors: Mark Rosenzweig, Chesnut Hill, MA (US); David M. Audette, Webster, MA (US)

(73) Assignee: Euro-Pro Operating LLC, Newton, MA (US)

( * ) Notice: Subject to any disclaimer, the term of this patent is extended or adjusted under 35 U.S.C. 154(b) by 61 days.

(21) Appl. No.: 13/781,743

(22) Filed: Feb. 28, 2013

(65) Prior Publication Data

US 2013/0264401 A1 Oct. 10, 2013

Related U.S. Application Data

(60) Provisional application No. 61/621,662, filed on Apr. 9, 2012.

(51) Int. Cl.
| | |
|---|---|
| *B02C 4/06* | (2006.01) |
| *A47J 43/07* | (2006.01) |
| *A47J 43/046* | (2006.01) |
| *A47J 43/04* | (2006.01) |
| *A47J 43/08* | (2006.01) |

(Continued)

(52) U.S. Cl.
CPC .............. *A47J 43/0722* (2013.01); *A47J 43/04* (2013.01); *A47J 43/046* (2013.01); *A47J 43/085* (2013.01); *B01F 7/00275* (2013.01); *B01F 7/00641* (2013.01); *B01F 13/1044* (2013.01); *B01F 2013/108* (2013.01)

(58) Field of Classification Search
CPC ............................ A47J 43/046; A47J 43/0722

USPC .............. 241/282.1, 282.2, 92; 366/205, 246; 99/510, 513

See application file for complete search history.

(56) References Cited

U.S. PATENT DOCUMENTS

| | | | |
|---|---|---|---|
| 2,209,287 | A | 7/1940 | Simpson |
| 2,546,949 | A | 3/1951 | Morrison |
| 2,798,700 | A | 7/1957 | Corbett et al. |

(Continued)

FOREIGN PATENT DOCUMENTS

| | | |
|---|---|---|
| CN | 2787112 Y | 6/2006 |
| CN | 201996377 U | 10/2011 |

(Continued)

OTHER PUBLICATIONS

International Search Report and Written Opinion for PCT/US2013/057205 mailed Nov. 27, 2013.

(Continued)

*Primary Examiner* — Faye Francis
(74) *Attorney, Agent, or Firm* — Wolf, Greenfield & Sacks, P.C.

(57) ABSTRACT

A food processor includes at least two different types of blades to process foods. A processing assembly includes a shaft, a set of pureeing blades attached to the shaft, and a set of substantially horizontal blades attached to the shaft. Each substantially horizontal blade may have a rearwardly curved leading cutting edge. The substantially horizontal blades are positioned higher with a food processing container than the pureeing blades. In some embodiments, upwardly angled blades may be included to induce vertical circulation and/or vortical flow of the processed food.

19 Claims, 7 Drawing Sheets

(51) Int. Cl.
*B01F 7/00* (2006.01)
*B01F 13/10* (2006.01)

(56) References Cited

U.S. PATENT DOCUMENTS

| | | | |
|---|---|---|---|
| 2,807,447 | A | 9/1957 | Vaughan |
| 2,930,596 | A | 3/1960 | Waters |
| 4,071,789 | A | 1/1978 | Ernster et al. |
| 4,256,407 | A | 3/1981 | Seiderman |
| 4,274,023 | A | 6/1981 | Lamprey |
| 4,339,205 | A | 7/1982 | Kato et al. |
| 4,403,868 | A | 9/1983 | Kupka |
| 4,480,926 | A | 11/1984 | Lattery, Jr. et al. |
| 4,509,860 | A | 4/1985 | Lasar, III |
| 4,854,720 | A | 8/1989 | Schold |
| 4,911,557 | A | 3/1990 | Dormer et al. |
| 5,190,375 | A | 3/1993 | Shiobara |
| 5,213,415 | A | 5/1993 | Saeki |
| 5,350,235 | A | 9/1994 | Hagen et al. |
| 5,460,444 | A | 10/1995 | Howorka |
| 5,487,511 | A | 1/1996 | Sansone et al. |
| 5,533,801 | A | 7/1996 | Safont et al. |
| 5,823,672 | A | 10/1998 | Barker |
| 5,823,673 | A | 10/1998 | Muntener |
| 6,012,837 | A | 1/2000 | Thuma |
| 6,050,720 | A | 4/2000 | Tuyuki |
| 6,164,812 | A | 12/2000 | Brezovnik et al. |
| 6,189,441 | B1 | 2/2001 | Beaudet et al. |
| 6,227,698 | B1 | 5/2001 | Muntener |
| 6,255,751 | B1 | 7/2001 | Hoffmann |
| 6,280,076 | B1 | 8/2001 | Muntener |
| 6,364,226 | B1 | 4/2002 | Kubicko |
| 6,604,455 | B2 | 8/2003 | Areh et al. |
| 6,609,821 | B2 | 8/2003 | Wulf et al. |
| 6,640,693 | B2 | 11/2003 | Brezovnik et al. |
| 6,655,265 | B2 | 12/2003 | Pavlovic et al. |
| 6,681,687 | B2 | 1/2004 | Areh et al. |
| 6,690,128 | B1 | 2/2004 | Cotton et al. |
| D513,685 | S | 1/2006 | Katz et al. |
| 6,981,795 | B2 | 1/2006 | Nikkah |
| 6,986,476 | B2 | 1/2006 | Unteregger |
| 7,318,375 | B2 | 1/2008 | Huang |
| 7,350,963 | B2 | 4/2008 | Williams et al. |
| 7,395,751 | B2 | 7/2008 | Liu |
| 7,404,665 | B2 | 7/2008 | Bacher et al. |
| 7,422,169 | B2 | 9/2008 | Mueller |
| 7,552,885 | B2 | 6/2009 | Katz et al. |
| 7,585,102 | B2 | 9/2009 | Bacher et al. |
| 7,677,485 | B2 * | 3/2010 | Gursel ............... 241/282.1 |
| 7,685,933 | B2 | 3/2010 | Fevre |
| 8,197,121 | B2 | 6/2012 | Sands |
| 8,251,573 | B2 | 8/2012 | Chou |
| 2006/0158958 | A1 | 7/2006 | Romanik |
| 2009/0090254 | A1 | 4/2009 | Herren |
| 2009/0109793 | A1 | 4/2009 | Xue |
| 2009/0190439 | A1 | 7/2009 | Yeung |
| 2009/0193982 | A1 | 8/2009 | Chou |
| 2011/0101138 | A1 | 5/2011 | Unteregger et al. |
| 2011/0185920 | A1 | 8/2011 | Oblak et al. |
| 2011/0226140 | A1 | 9/2011 | Herren |
| 2012/0129643 | A1 | 5/2012 | Cheung et al. |
| 2013/0264404 | A1 | 10/2013 | Rosenzweig et al. |

FOREIGN PATENT DOCUMENTS

| | | |
|---|---|---|
| EP | 0 022 465 A1 | 1/1981 |
| EP | 0 570 685 A | 11/1993 |
| EP | 0 529 287 B1 | 9/1995 |
| GB | 1 447 430 A | 8/1976 |
| GB | 2 303 537 A | 2/1997 |
| WO | WO 00/36960 A1 | 6/2000 |
| WO | WO 2012/113667 A1 | 8/2012 |

OTHER PUBLICATIONS

International Search Report and Written Opinion for PCT/US2013/057210 mailed Dec. 18, 2013.

[No Author Listed] Ninja™. Professional Blender. NJ600 30. Owner's Guide. 2010. 11 pages.

* cited by examiner

FOOD PROCESSOR

RELATED APPLICATIONS

This Application claims the benefit under 35 U.S.C. §119(e) of U.S. Provisional Application Ser. No. 61/621,662, filed on Apr. 9, 2012.

FIELD

Aspects herein generally relate to food processors, processing assemblies for food processors, and methods of processing food. More specifically, aspects disclosed herein relate to a processing assemblies with certain blade arrangements.

DISCUSSION OF RELATED ART

Food processors such as blenders use a rotating blade assemblies to process food. Some food processors include substantially horizontal blades which perform well when chopping ice or large food items.

SUMMARY

According to one embodiment of the invention, a food processor blade assembly includes a shaft having an axis of rotation, a first, lower set of blades rotatable by the shaft about the axis of rotation, and a second, higher set of blades rotatable by the shaft about the axis of rotation, the second set of blades positioned higher on the shaft than the first set of blades. The first, lower set of blades includes first and second blades, each blade having at least a portion angled downwardly relative to a horizontal plane. The first, lower set of blades includes third and fourth blades, each blade having at least a portion angled upwardly relative to a horizontal plane, the upwardly angled portions of the third and fourth blades being positioned higher than the downwardly angled portions of the first and second blades. The second, higher set of blades includes fifth and sixth blades, each of which is a substantially horizontal blade having a rearwardly curved leading cutting edge.

According to another embodiment, a food processing apparatus includes a motor, a food processing container, and a processing assembly configured to be rotated within the food container by the motor. The blade assembly includes a shaft having an axis of rotation, a first, lower set of blades rotatable by the shaft about the axis of rotation, and a second, higher set of blades rotatable by the shaft about the axis of rotation. The second set of blades is positioned higher on the shaft than the first set of blades. The first, lower set of blades includes first and second blades, each blade having at least a portion angled downwardly relative to a horizontal plane. The first, lower set of blades includes third and fourth blades, each blade having at least a portion angled upwardly relative to a horizontal plane, the upwardly angled portions of the third and fourth blades being positioned higher than the downwardly angled portions of the first and second blades. The second, higher set of blades includes fifth and sixth blades, each of which is a substantially horizontal blade having a rearwardly curved leading cutting edge.

According to another embodiment, a method of processing food includes associating a food processing container with a drive assembly, wherein the food processing container including a blade assembly. The method further includes adding food to the food processing container, and processing food with the blade assembly. The act of processing includes chopping the food with a set of substantially horizontal blades, each substantially horizontal blade having a rearwardly curved leading cutting edge, and blending the food with a set of downwardly angled blades, the downwardly angled blades being positioned lower within the food processing container relative to the set of substantially horizontal blades. The method also includes vertically circulating the food with a set of upwardly angled blades, the upwardly angled blades being positioned higher than the set of downwardly angled blades and lower than the set of substantially horizontal blades.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. Various embodiments of the invention will now be described, by way of example, with reference to the accompanying drawings, in which.

DETAILED DESCRIPTION

A food processing assembly is provided herein which includes different blade types to effectively process food, including food which is typically difficult to process. In some embodiments, the processing assembly includes a set of blades which are effective at pureeing and/or creating a vortex and/or a vertical circulation of blended food. This set of blades may be positioned within a lower quarter of a food container when the processing assembly is put into place within the container. A second set of blades comprising a different type of blade may be positioned at a higher level within the food container as compared to the lower set of puree blades. In some embodiments, this upper set of blades may include substantially horizontal blades which are effective at chopping ice and/or large food articles.

By providing both types of blades, food and ice may be effectively and quickly chopped and pureed. Additionally, the lower set of blades may be provided with blades that create a vertical circulation of blended food. In some embodiments, these blades may be angled upwardly just above downwardly angled puree blades. By rotating the upwardly angled blades at a high rotation rate, for example, at 18,000 rpm or higher in some embodiments, a vertical circulation quickly moves blended food upwardly and away from the puree blades, while drawing unblended or less blended food downwardly into the puree blades. In this manner, most or all of the food in the container is processed by the puree blades. Similarly, this vertical circulation helps move food through a zone where it may be chopped by the set of horizontal blades. In some embodiments, some or all of the blades of the processing assembly create a vortex of liquid flow.

Horizontal blades of the types disclosed herein are typically rotated at speeds lower than 18,000 rpm because damage to the blade and/or breakage of the connection between the blade and shaft can occur. According to one embodiment disclosed herein, the horizontal blades are made with stainless steel and are welded to a stainless steel shaft. In some embodiments, the welded blade and shaft arrangement is overmolded with plastic.

As used herein, the term "processing tool" refers to any tool used to process foods and other materials. Processing tools may include, but are not limited to, a blade assembly, a whisk, an ice crushing assembly, a dicing assembly, a grater, and a shredder. A blade assembly may contain a single blade or more than one blade. As used herein, the term "food" includes any solid or liquid comestible, and any mix between a solid and a liquid. For purposes herein, a blade does not necessarily have to include a sharp, leading edge.

As used herein, the terms "connected," "attached," or "coupled" are not limited to a direct connection, attachment, or coupling, as two components may be connected, attached, or coupled to one another via intermediate components.

Figure 1:
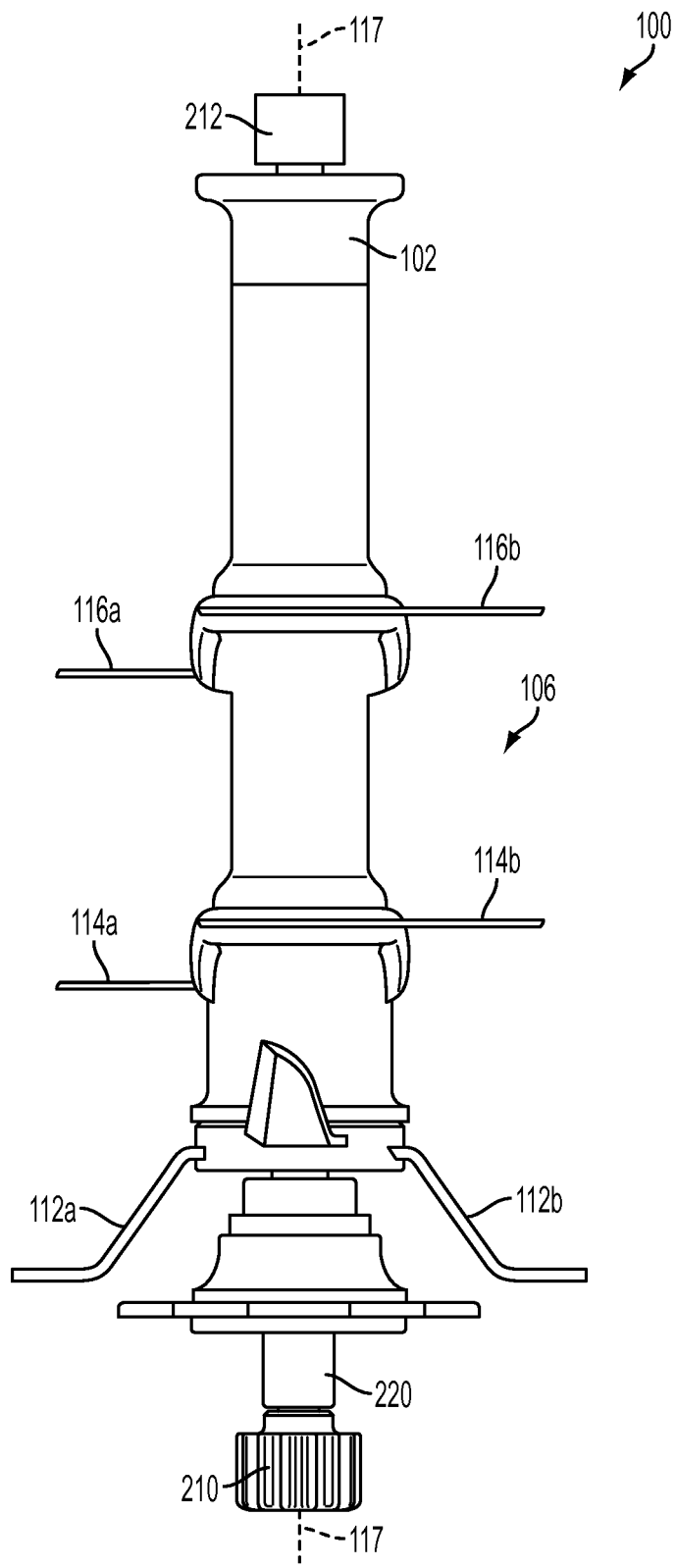
FIG. 1 is a side view showing a food processing assembly according to one embodiment.

According to one embodiment, as shown in FIG. 1, a processing assembly 100 includes a rotatable shaft 102 with a first set of blades 104, a second set of blades 106, and a third set of blades 108. In some embodiments, the first set of blades 104 may be positioned lower on the shaft than other sets of blades. First set of blades 104 may include blades which are upwardly and/or downwardly angled. Such an arrangement may help to create a vertical circulation within the food-containing volume to enhance mixing and circulation of the food, thereby promoting more effective pureeing of the food. In one embodiment, as shown in FIG. 1, the first set of blades 104 includes a first upwardly angled blade 110a and a second upwardly angle blade 110b which is not shown in FIG. 1 but is positioned on an opposite side of shaft 102 from blade 110. First set of blades 104 also includes two downwardly angled blades 112a, 112b. Downwardly angled blades 112a, 112b may be particularly effective at pureeing and/or liquefying food in some embodiments.

Figure 3:
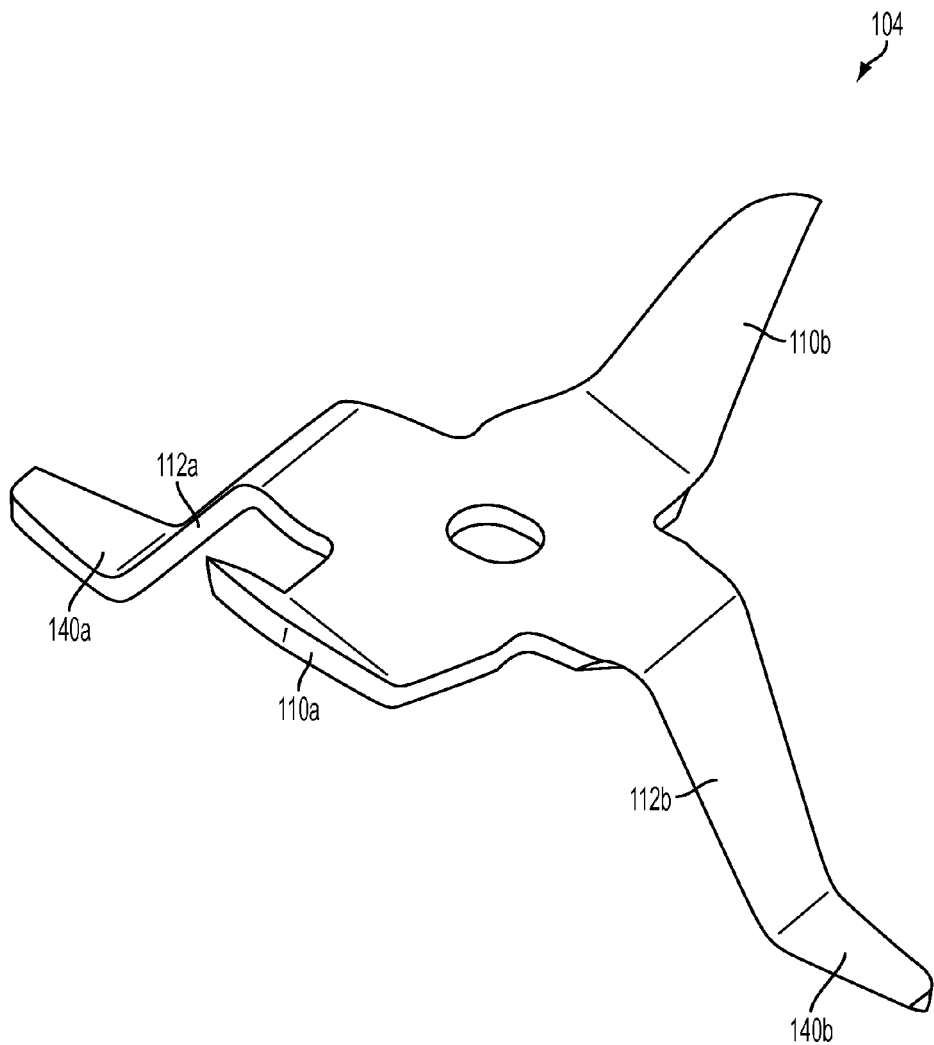
FIG. 3 is a perspective view of a blade assembly according to one embodiment.

In some cases, the upwardly angled and the downwardly angled blades may be formed from a single unitary body, as shown in FIG. 3. In other cases, the blades may be joined together via welding or other suitable arrangement. The upwardly angled blades 110a, 110b and downwardly angled blades 112a, 112b do not have to be directly connected for these blades to be considered to be part of a set of blades.

Second set of blades 106 includes blades 114a, 114b which are substantially horizontal when the overall processing assembly is mounted in a blender or other food processor. The horizontal blades may be particularly effective in chopping ice or large food items. In some cases, blade 114a and blade 114b may be formed from a single unitary component. In other cases, each of blades 114a, 114b may be separate blades. Blades 114a, 114b may be attached to shaft 102 via welding or other suitable manner. In some embodiments, blades 114a, 114b and shaft 102 are constructed of stainless steel and welded together.

Third set of blades 108 includes blades 116a and 116b, which are also substantially horizontal blades in some embodiments. As with second set of blades 106, blades 116a and 116b may be separate from one other, or part of a unitary blade assembly. These blades may be welded to shaft 102, or otherwise suitably attached, such as by overmolding in some embodiments.

A driven coupler 210 may be positioned at a bottom of processing assembly 100 to be driven by an associated drive coupler of a food processor base. Any suitable drive mechanism may be employed with embodiments herein. A support member 212 may be positioned at a top of shaft 102 to interface with a lid of a food processing container in support of rotation about an axis of rotation 117. The support member may be allowed to rotated within a recess in the lid in some embodiments.

Figure 2:
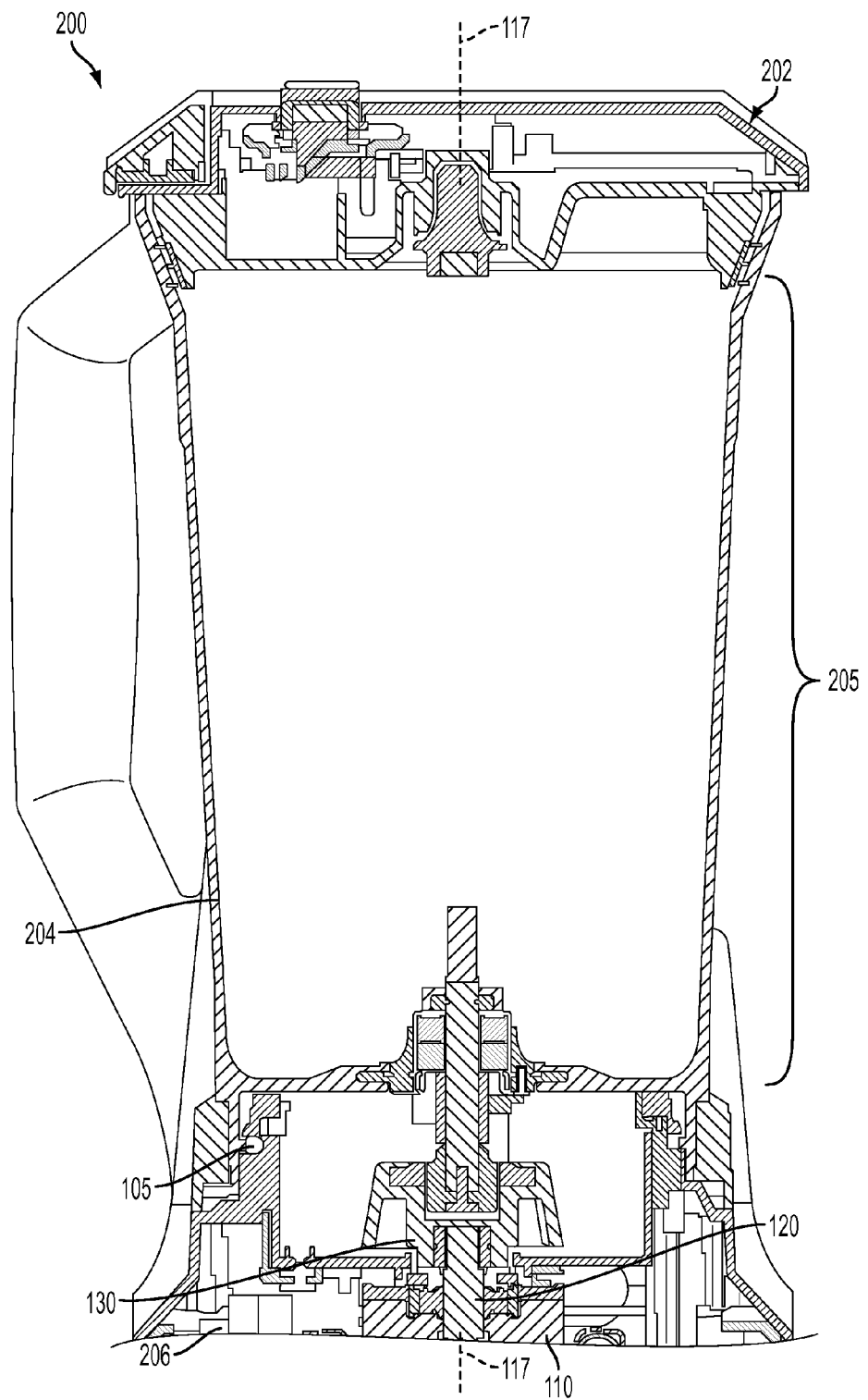
FIG. 2 is a cross-sectional view of a food processor according to one embodiment.

A food processing apparatus 200 is shown in FIG. 2 and includes a lid 202, a container 204, and a base 206. The container 204 removably engages with the base 206 via a locking mechanism 105 which includes a collection of protrusions and indents on the base 206 and the container 204. The container can be removably fixed to the base by placing the container 204 onto the base 206 and twisting the container 204 relative to the base 206 to engage the mechanical locking mechanism 105 between the container and the base. Any suitable locking mechanism can be used, as this aspect is not limiting. For example, the container may engage with the base by pressing the container down onto the base or by sliding the container laterally onto the base. In some embodiments, the container does not lock or engage with the base, but instead only operatively interacts with the base, for example to receive rotational power from the base.

The container 204 may be any suitable volume and design. In some cases, the container is a small single-serve jar that may be used as a drinking cup after the processing assembly is removed from the jar. In some cases, the container is a larger pitcher that can hold multiple servings. The container may include a handle and a spout to facilitate pouring of contents and/or the lifting and moving of the container. The lid 202 may include a hole through which food can pass such that food can be added to or removed from the food-containing volume 205 without removing the lid 202 from the container 204. A cap may be used to cover or uncover such a hole in the lid. The cap may attach to the lid in any suitable manner, for example, via threads that allow the cap to be screwed onto the lid, by a hinge that connects the cap to the lid, or via an interference fit, as this aspect is not limited in this regard.

Food processing apparatus 200 may include the processing assembly 100 illustrated in FIG. 1 within the food-containing volume 205. As used herein, the "food-containing volume" is the volume in the container within which food is located during food processing.

The base 206 includes a motor 110 which is connected to a drive shaft 120, which in turn is connected to a drive coupler 130. The drive coupler 130 interfaces with a driven coupler 210 of the processing assembly 215, as shown in FIG. 2. In some embodiments, the drive coupler 130 and the driven coupler 210 can be removably coupled to one another. In one embodiment, the driven coupler 210 is attached to the container 204 such that, when the container 204 is lifted off the base 100, the driven coupler 210 is removed from the drive coupler 130. In other embodiments, the drive coupler 130 may be permanently attached to the driven coupler 210.

Figure 7:
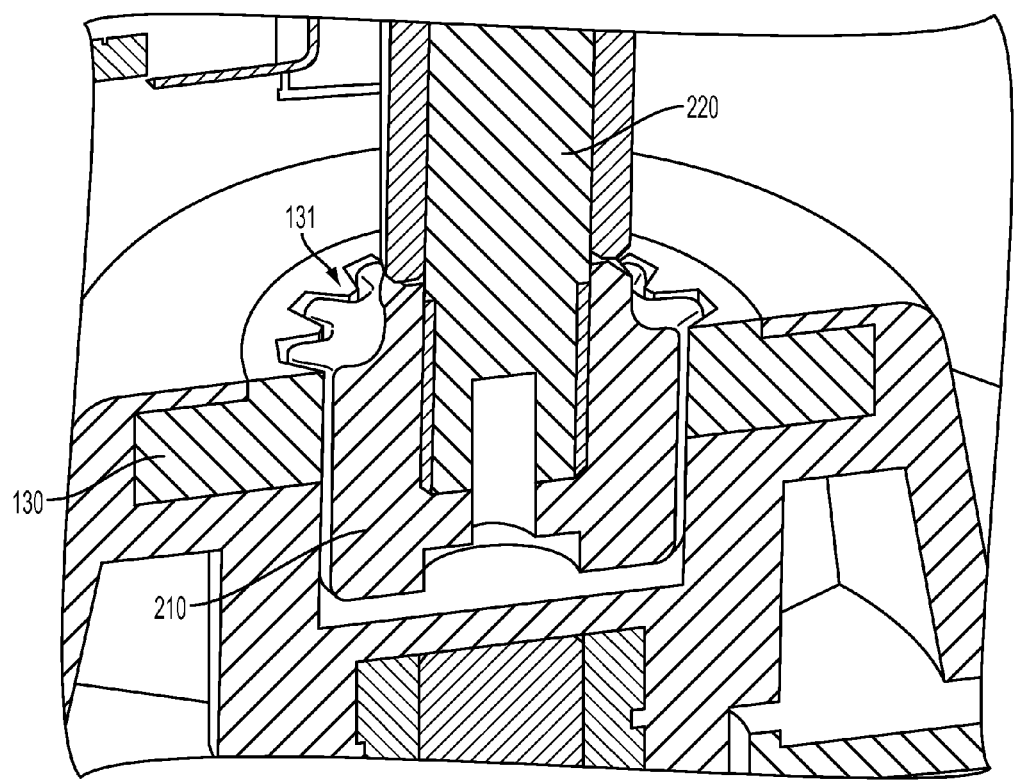
FIG. 7 is an enlarged view that depicts the interface between a drive coupler and a driven coupler in accordance with an aspect of the invention.

FIG. 7 shows an enlarged view of the interface between the drive coupler 130 and the driven coupler 210. The drive coupler 130 may include a recess with a plurality of protruding teeth 131. Any suitable number of teeth 131 may be used. When the recess of the drive coupler 130 receives the driven coupler 210, the motor 110 becomes connected to the processing assembly 100.

In some embodiments, the shaft and associated blades are rotated at 24,000 RPM, 25,000 RPM or higher. In some embodiments, the shaft and associated blades are rotated at 18,000 RPM. In some embodiments, a control panel is provided and a user can adjust or select speeds from a provided range of speeds. In some embodiments, the rotation speeds may vary from 5,000 RPM up to 18,000 RPM or higher. The blades or other processing tools may be rotated at various speeds that are suitable for shredding, grating, slicing, or chopping, in some embodiments. In some embodiments, a speed reduction assembly, such as a gear assembly, may be provided on an underside of container 204 and/or within base 206.

The above described components may be made with various materials, and the above aspects may be employed in any suitable combination.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

FIG. 3 illustrates one embodiment of a set of upwardly angled blades and downwardly angled blades and described above. In the illustrated embodiment, each of downwardly angled blades 112a, 112b includes a horizontal blade portion 140a, 140b extending from its respective end. These horizontal extensions can help puree food in some embodiments by squeezing partially liquefied food between the extensions and a base of the container. Zero, one, two, three or all of blades 110a, 110b, 112a and 112b may include a sharp, cutting leading edge.

Figure 4:
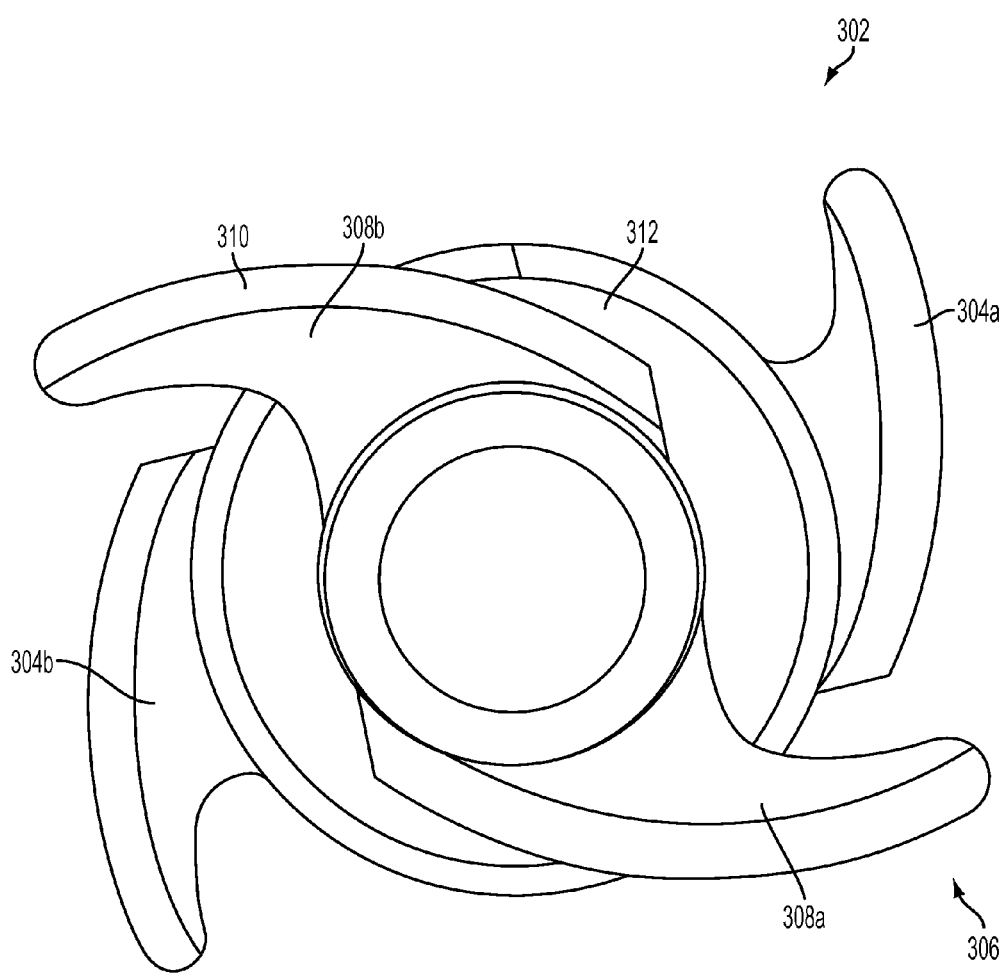
FIG. 4 is a top view of a blade assembly according to one embodiment.

FIG. 4 is a top view of two sets of substantially horizontal blades. A first set 302 of horizontal blades include two opposed blades 304a, 304b. In some embodiments, more than two blades may be provided in any given set of blades. For example, four blades positioned around the shaft at ninety degree intervals may be used in some embodiments.

A second set 306 of blades 308a, 308b is angularly positioned at a ninety degree angle relative to firs set 302 of blades in the illustrated embodiment. Of course, this second set of blades 306 can be angularly positioned at any suitable position. Each of the blades shown in FIG. 4 has a sharp, leading cutting edge 310. Additionally, on each of the blades, the leading cutting edge is rearwardly curved relative to the rotation direction. As shown in FIG. 4, one set of blades (e.g., first set 302) may be mounted to a shaft portion 312 having a larger diameter than other portions of the shaft.

Figure 5:
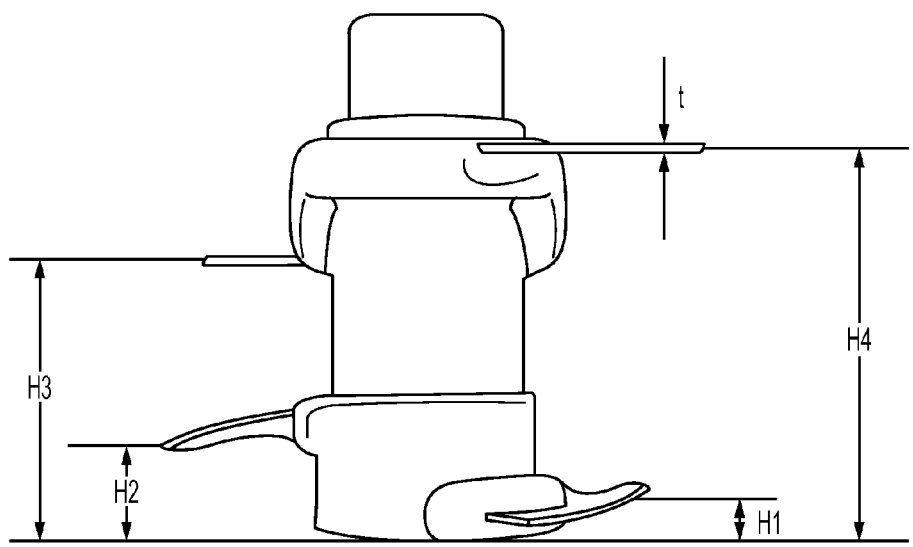
FIG. 5 is a side view of a blade assembly according to one embodiment.

FIG. 5 shows one particular embodiment of four substantially horizontal blades which include rearwardly curved leading, cutting edges. Each of the blades in the illustrated embodiment has a maximum thickness t of 1.2 mm, with a thinner section at the leading edge. Of course, other thicknesses may be provided, and not all of the blades need have the same thickness. A distance H1 from a lowest point of the shaft-blade connection to a lowest horizontal blade is 2.6 mm in the illustrated embodiment, while a distance H2 from the lowest point to a second blade is 13 mm. A third blade is positioned at a distance H3 of 35 mm from the lowest point of the shaft-blade connection in the illustrated embodiment, and a fourth blade is positioned at distance of 45 mm from the lowest point. Of course, any suitable distances may be used, and two or more blades may be located at a same distance from the lowest point. The upper and lower blades in each set may differ in height from each other by about 10-12 mm in some embodiments. The lower blade of the upper set may be about 22 mm higher than the upper blade of the lower set. The tip of one blade may be horizontally distanced by approximately 57 mm from the tip of a directly opposed blade in some embodiments. Of course, in some embodiments, only one or only two substantially horizontal blades may be provided on the shaft of the processing assembly. Further, in some embodiments, one, some, or all of the substantially horizontal blades that are provided may be positioned below any provided puree or vertical mixing blades, such as downwardly angled blades and upwardly angled blades.

Figure 6:
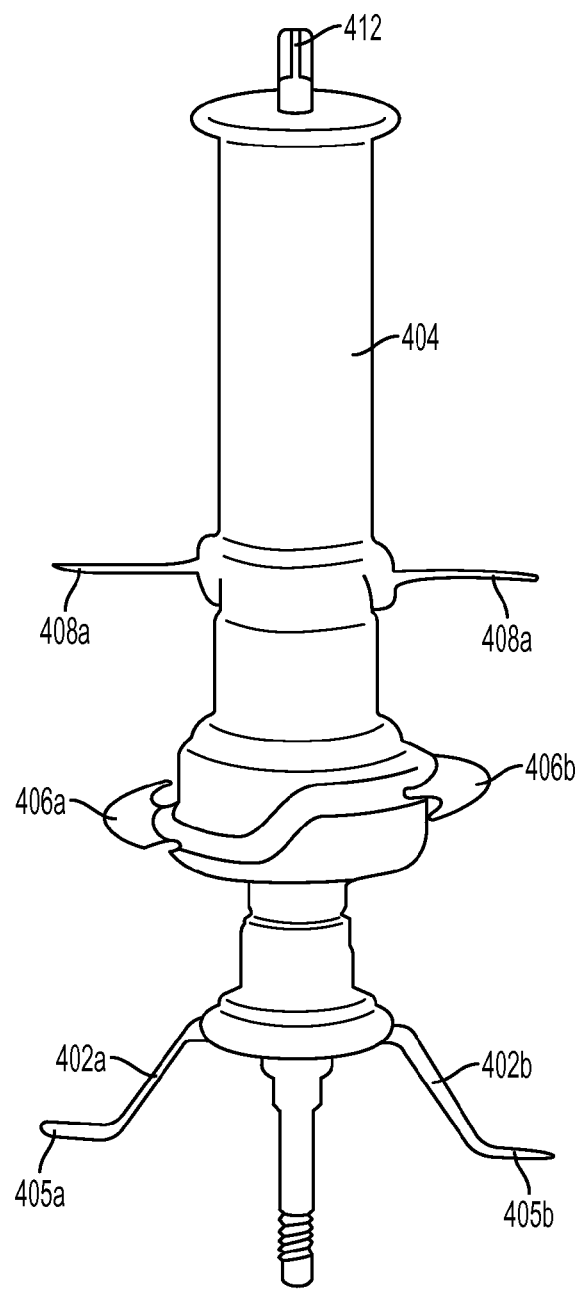
FIG. 6 is a perspective view of a blade assembly according to another embodiment.

FIG. 6 shows another embodiment of a processing blade assembly 400. In this embodiment, no upwardly angled blades are provided. Two downwardly angled blades 402a, 402b are positioned at a lower end of a shaft 404. These downwardly angled blades may be positioned such that horizontal portions 405a, 405b are positioned within the lowest quarter of an associated food container. In some embodiments, the blades may be positioned such that horizontal portions 405a, 405b are positioned within the lowest eighth of an associated food container.

Vertically offset substantially horizontal blades 406a, 406, 408a and 408b are provided above blades 402a, 402b in this embodiment.

In some embodiments, the blade assembly may be driven by a motor and/or drive coupling located at a top of shaft 404 which engages with a driven coupler 412. Or, the blade assembly may be driven by a drive coupling located at a bottom of the blade assembly.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A food processor blade assembly comprising:
   a shaft having an axis of rotation;
   a first, lower set of blades rotatable by the shaft about the axis of rotation; and
   a second, higher set of blades rotatable by the shaft about the axis of rotation, the second set of blades positioned higher on the shaft than the first set of blades;
   wherein:
      the first, lower set of blades includes first and second blades, each blade having at least a portion angled downwardly relative to a horizontal plane and a horizontal portion extending from an end of the downward angled portion;
      the first, lower set of blades includes third and fourth blades, each blade having at least a portion angled upwardly relative to a horizontal plane, the upwardly angled portions of the third and fourth blades being positioned higher than the downwardly angled portions of the first and second blades; and
      the second, higher set of blades includes fifth and sixth blades, each of which is a substantially horizontal blade having a rearwardly curved leading cutting edge.

2. The food processor blade assembly as in claim 1, wherein the fifth, substantially horizontal blade of the second, higher set of blades is positioned higher than the sixth, substantially horizontal blade of the second, higher set of blades.

3. The processor blade assembly as in claim 1, further comprising a third set of blades, the third set of blades including seventh and eighth blades, each of which is a substantially horizontal blade and has a rearwardly curved leading cutting edge, and wherein the third set of blades is positioned higher than the second set of blades.

4. The food processor blade assembly as in claim 3, wherein the seventh, substantially horizontal blade of the third set of blades is positioned higher than the eighth, substantially horizontal blade of the third set of blades.

5. The processor blade assembly as in claim 1, wherein the horizontal blade portion of each of the first and second blades has a leading cutting edge.

6. The processor blade assembly as in claim 1, wherein the shaft is a substantially vertical shaft.

7. The processor blade assembly as in claim 1, wherein each of the first and second blades has a sharp, cutting edge as a leading edge.

8. The processor blade assembly as in claim 1, wherein each of the third and fourth blades has a sharp, cutting edge as a leading edge.

9. A food processing apparatus comprising:
- a motor;
- a food processing container; and
- a processing assembly configured to be rotated within the food container by the motor;
- wherein the blade assembly includes:
    - a shaft having an axis of rotation;
    - a first, lower set of blades rotatable by the shaft about the axis of rotation; and
    - a second, higher set of blades rotatable by the shaft about the axis of rotation, the second set of blades positioned higher on the shaft than the first set of blades;
    - wherein:
        - the first, lower set of blades includes first and second blades, each blade having at least a portion angled downwardly relative to a horizontal plane and a horizontal portion extending from an end of the downward angled portion;
        - the first, lower set of blades includes third and fourth blades, each blade having at least a portion angled upwardly relative to a horizontal plane, the upwardly angled portions of the third and fourth blades being positioned higher than the downwardly angled portions of the first and second blades; and
        - the second, higher set of blades includes fifth and sixth blades, each of which is a substantially horizontal blade having a rearwardly curved leading cutting edge.

10. The food processing apparatus as in claim 9, wherein the fifth, substantially horizontal blade of the second, higher set of blades is positioned higher than the sixth, substantially horizontal blade of the second, higher set of blades.

11. The food processing apparatus as in claim 9, further comprising a third set of blades, the third set of blades including seventh and eighth blades, each of which is a substantially horizontal blade and has a rearwardly curved leading cutting edge, and wherein the third set of blades is positioned higher than the second set of blades.

12. The food processing apparatus as in claim 11, wherein the seventh, substantially horizontal blade of the third set of blades is positioned higher than the eighth, substantially horizontal blade of the third set of blades.

13. The food processing apparatus as in claim 9, wherein the horizontal blade portion of each of the first and second blades has a leading cutting edge.

14. The food processing apparatus as in claim 9, wherein the shaft is a substantially vertical shaft.

15. A method of processing food comprising:
- associating a food processing container with a drive assembly, the food processing container including a blade assembly;
- adding food to the food processing container;
- processing food with the blade assembly, the act of processing including:
- chopping the food with a set of substantially horizontal blades, each substantially horizontal blade having a rearwardly curved leading cutting edge;
- blending the food with a set of downwardly angled blades, the downwardly angled blades being positioned lower within the food processing container relative to the set of substantially horizontal blades, and each downwardly angled blade having a horizontal portion extending from an end of a downwardly angled portion; and
- vertically circulating the food with a set of upwardly angled blades, the upwardly angled blades being positioned higher than the set of downwardly angled blades and lower than the set of substantially horizontal blades.

16. The method as in claim 15, wherein the set of substantially horizontal blades includes four substantially horizontal blades, each positioned at a different vertical position than the others of the four substantially horizontal blades.

17. The method as in claim 15, further comprising creating a vorticial flow by rotating the upwardly angled blades.

18. The method as in claim 17, wherein rotating the upwardly angled blades comprises rotating the upwardly angled blades at a rotation speed of at least 18,000 RPM.

19. The method as in claim 18, wherein rotating the upwardly angled blades comprises rotating the upwardly angled blades at a rotation speed of no more than 25,000 RPM.

* * * * *